United States Patent
Kageyama

(10) Patent No.: US 7,752,310 B2
(45) Date of Patent: Jul. 6, 2010

(54) COMPUTER PROGRAM, METHOD, AND APPARATUS FOR MANAGING RESERVATION OF IT RESOURCES

(75) Inventor: Hideyuki Kageyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 826 days.

(21) Appl. No.: 11/407,318

(22) Filed: Apr. 19, 2006

(65) Prior Publication Data

US 2007/0165525 A1 Jul. 19, 2007

(30) Foreign Application Priority Data

Jan. 18, 2006 (JP) .............................. 2006-009496

(51) Int. Cl.
*G06F 15/173* (2006.01)
*G06F 15/16* (2006.01)

(52) U.S. Cl. .................... 709/226; 709/229; 370/395.4; 705/8; 718/104; 718/102

(58) Field of Classification Search ................ 370/229, 370/241, 230, 235
See application file for complete search history.

(56) References Cited

U.S. PATENT DOCUMENTS

| | | | | |
|---|---|---|---|---|
| 5,859,856 A * | 1/1999 | Oskouy et al. | ........... | 370/395.4 |
| 6,335,922 B1 * | 1/2002 | Tiedemann et al. | ......... | 370/335 |
| 6,438,134 B1 * | 8/2002 | Chow et al. | ................. | 370/412 |
| 6,571,215 B1 * | 5/2003 | Mahapatro | ..................... | 705/8 |
| 6,959,327 B1 * | 10/2005 | Vogl et al. | .................. | 709/219 |
| 7,054,293 B2 * | 5/2006 | Tiedemann et al. | ......... | 370/335 |
| 7,403,994 B1 * | 7/2008 | Vogl et al. | .................. | 709/227 |
| 2002/0012332 A1 * | 1/2002 | Tiedemann et al. | ......... | 370/335 |
| 2002/0160812 A1 * | 10/2002 | Moshiri-Tafreshi et al. | . | 455/561 |
| 2006/0203731 A1 * | 9/2006 | Tiedemann et al. | ......... | 370/235 |
| 2007/0165525 A1 * | 7/2007 | Kageyama | .................. | 370/230 |
| 2008/0313638 A1 * | 12/2008 | Ohura et al. | ................ | 718/104 |

FOREIGN PATENT DOCUMENTS

JP  2004-302748  10/2004

* cited by examiner

*Primary Examiner*—Donald L Mills
*Assistant Examiner*—Steven Wood
(74) *Attorney, Agent, or Firm*—Greer, Burns & Crain, Ltd.

(57) ABSTRACT

A computer program, method, and apparatus that manage reservation of IT resources for efficient use thereof. Upon receipt of a reservation request, an IT resource finder identifies IT resources that are available for reservation in a period specified in the request. Subsequently a vacant period finder identifies vacant periods containing the specified reservation period, based on the reservation records of each IT resource. Out of the found vacant periods, an idlest period selector then selects an idlest period that offers a largest number of available IT resources. From among a set of IT resources whose vacant periods agree with the idlest period, an IT resource selector selects an appropriate resource to serve the given reservation request. A reservation registration processor then registers the reserved IT resource with the reservation data repository as determined by the IT resource selector.

9 Claims, 21 Drawing Sheets

120 CONFIGURATION DATA REPOSITORY

| IT RESOURCE | CONFIGURATION DATA |
|---|---|
| SERVER #1 | Hardware and software configuration of SERVER #1<br>• CPU, memory, hard disk capacity<br>• OS name and version, middleware names and versions |
| SERVER #2 | Hardware and software configuration of SERVER #2 |
| SERVER #3 | Hardware and software configuration of SERVER #3 |
| SERVER #4 | Hardware and software configuration of SERVER #4 |
| SERVER #5 | Hardware and software configuration of SERVER #5 |
| SERVER #6 | Hardware and software configuration of SERVER #6 |

FIG. 5

130 RESERVATION MANAGEMENT DATA REPOSITORY

| RESERVATION PERIOD | | IT RESOURCE | APPLICATION |
|---|---|---|---|
| START DATE | END DATE | | |
| 2005/1/1 | 2005/1/31 | SERVER #3 | APPLICATION a |
| 2005/2/1 | 2005/3/31 | SERVER #4 | APPLICATION b |
| 2005/3/1 | 2005/3/31 | SERVER #3 | APPLICATION c |
| 2005/4/1 | 2005/5/31 | SERVER #1 | APPLICATION d |
| 2005/4/1 | 2005/4/30 | SERVER #5 | APPLICATION e |
| 2005/5/1 | 2005/5/31 | SERVER #2 | APPLICATION f |
| 2005/5/1 | 2005/7/31 | SERVER #6 | APPLICATION g |
| 2005/7/1 | 2005/8/31 | SERVER #3 | APPLICATION h |
| 2005/7/1 | 2005/7/31 | SERVER #4 | APPLICATION i |
| 2005/7/31 | 2005/8/31 | SERVER #5 | APPLICATION j |
| 2005/8/31 | 2005/9/30 | SERVER #1 | APPLICATION k |
| 2005/8/31 | 2005/10/31 | SERVER #2 | APPLICATION l |
| 2005/9/1 | 2005/9/30 | SERVER #4 | APPLICATION m |
| 2005/10/1 | 2005/10/31 | SERVER #3 | APPLICATION n |

FIG. 6

50 RESERVATION MANAGEMENT TABLE

| IT RESOURCE | VACANT PERIOD | FIRST HYPOTHETICAL VACANCY DURATION | SECOND HYPOTHETICAL VACANCY DURATION | CANDIDACY FLAG | NOMINATION FLAG |
|---|---|---|---|---|---|
| SERVER#1 | June 1, 2005 to Aug 31, 2005 | - | - | OFF | OFF |
| SERVER#2 | June 1, 2005 to Aug 31, 2005 | - | - | OFF | OFF |
| SERVER#3 | April 1, 2005 to June 30, 2005 | 120 days | 92 days | ON | OFF |
| SERVER#4 | April 1, 2005 to June 30, 2005 | (From Today) | 62 days | ON | ON |
| SERVER#5 | May 1, 2005 to July 31, 2005 | - | - | OFF | OFF |

FIG. 10

| VACANT PERIOD | RESOURCE COUNTER (NUMBER OF IT RESOURCES) | PERIOD CANDIDACY FLAG | PERIOD SELECTION FLAG |
|---|---|---|---|
| June 1, 2005 to Aug 31, 2005 | 2 | ON | OFF |
| April 1, 2005 to June 30, 2005 | 2 | ON | ON |
| May 1, 2005 to July 31, 2005 | 1 | OFF | OFF |

51 VACANT PERIOD TABLE

131 TIME TABLE    131a

| IT RESOURCE | '05/1 | 2 | 3 | 4 | 5 | 6 | 7 | 8 | 9 | 10 |
|---|---|---|---|---|---|---|---|---|---|---|
| SERVER #1 |  |  |  | d |  |  |  |  | k |  |
| SERVER #2 |  |  |  |  | f |  |  |  |  | l |
| SERVER #3 | a |  | c |  |  |  | h |  |  | n |
| SERVER #4 |  | b |  |  |  |  |  | i | m |  |
| SERVER #5 |  |  |  | e |  |  |  |  | j |  |
| SERVER #6 |  |  |  |  | g | g |  |  |  |  |

FIG. 20

COMPUTER PROGRAM, METHOD, AND APPARATUS FOR MANAGING RESERVATION OF IT RESOURCES

CROSS-REFERENCE TO RELATED APPLICATIONS

This application is based upon and claims the benefits of priority from the prior Japanese Patent Application No. 2006-009496, filed on Jan. 18, 2006, the entire contents of which are incorporated herein by reference.

BACKGROUND OF THE INVENTION

1. Field of the Invention

The present invention relates to a computer program, method, and apparatus for allocating IT resources to users. More particularly, the present invention relates to a reservation management program stored in a computer-readable medium, reservation management method, and reservation management apparatus for allocating resources in a grid computing environment.

2. Description of the Related Art

Grid computing is known as a technology that organizes many computers connected to a network to provide high-speed data processing services. Client entities of a grid computing system are allowed to use necessary processing resources (IT resources) that the system offers.

One of the key issues in the grid computing is how to allocate IT resources efficiently to clients. Some researchers have proposed a job scheduler that makes a tentative reservation for resources prior to job scheduling. The proposed technique permits the system to keep track of resource reservations, as well as to choose an optimal combination of resources. See, for example, Japanese Unexamined Patent Publication No. 2004-302748.

One of the responsibilities of a system administrator is to reserve IT resources necessary for execution of a client's business application. To aid this task, some software programs of a business grid computing system offer a brokering service that allocates optimal IT resources to client applications according to their requirements as to what resources are needed and when they should be available. The broker has not only to satisfy the conditions specified by the system administrator, but also to maximize the efficiency of IT resource usage. For efficient use of IT resources, the broker is supposed to reduce idle time of resources and accept as many reservation requests as possible.

There have, however, been no established algorithms for realizing efficient resource allocation in a grid computing environment. The technique disclosed in the aforementioned patent application does not necessarily make full use of resources since it primarily aims at preventing resource reservations from failing repeatedly.

SUMMARY OF THE INVENTION

In view of the foregoing, it is an object of the present invention to provide a reservation management program stored in a computer-readable medium, a reservation management method, and a reservation management apparatus that make efficient use of IT sources.

To accomplish the above object, the present invention provides a computer-readable medium storing a program for managing reservation of IT resources. The program causes a computer to function as the following components: a reservation data repository, an IT resource finder, a vacant period finder, an idlest period selector, an IT resource selector, and a reservation registration processor. The reservation data repository stores reservation records of IT resources. The IT resource finder is responsive to a reservation request specifying a desired reservation period. When such a reservation request is received, the IT resource finder finds IT resources available for reservation in the specified reservation period by consulting the reservation data repository. The vacant period finder then finds vacant periods containing the specified reservation period, based on the reservation records of each IT resource that the IT resource finder has found. The idlest period selector selects an idlest period that offers a largest number of available IT resources, from among the vacant periods that the vacant period finder has found. An IT resource selector selects, for reservation to serve the reservation request, an IT resource whose vacant period coincides with the idlest period. A reservation registration processor registers the selected IT resource with the reservation data repository as determined by the IT resource selector.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example data structure of a configuration data repository.

FIG. 6 shows an example data structure of a reservation management data repository.

FIG. 10 shows an example data structure of a reservation management table.

FIG. 20 shows a time table representing current reservation of resources.

DESCRIPTION OF THE PREFERRED EMBODIMENTS

Figure 1:
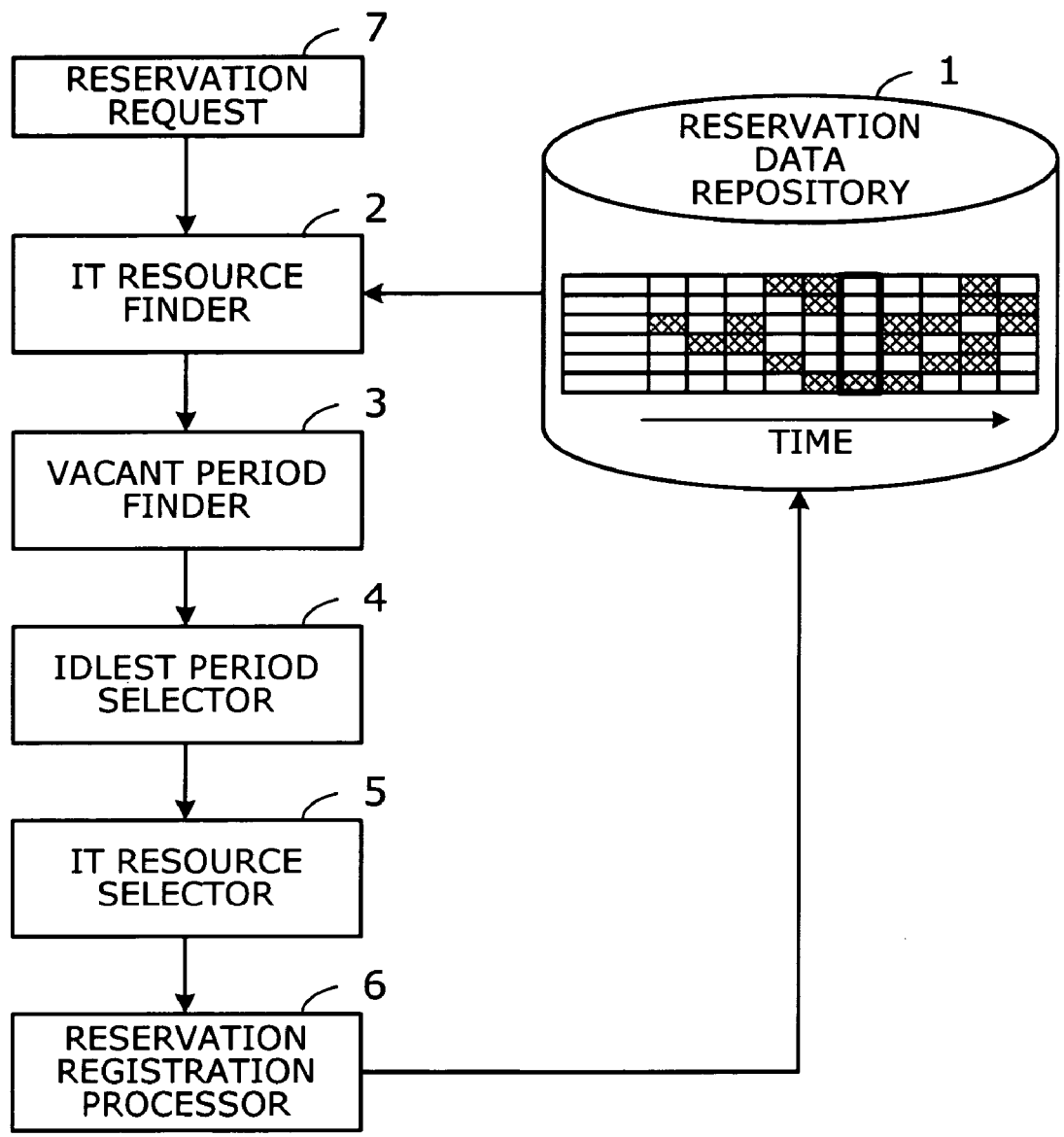
FIG. 1 provides an overview of an embodiment of the present invention.

Preferred embodiments of the present invention will be described below with reference to the accompanying drawings, wherein like reference numerals refer to like elements throughout.

FIG. 1 provides an overview of a reservation management apparatus according to an embodiment of the present invention. The illustrated reservation management apparatus manages reservation of IT resources, including hardware resources and software resources of servers. To this end, the reservation management apparatus has a reservation data repository 1, an IT resource finder 2, a vacant period finder 3, an idlest period selector 4, an IT resource selector 5, and a reservation registration processor 6.

The reservation data repository 1 stores reservation records of each IT resource. A reservation record includes, for example, start and end dates of a business application that will use reserved resources.

The IT resource finder 2 is responsive to a reservation request specifying a desired reservation period. Upon receipt of such a reservation request 7, the IT resource finder 2 consults the reservation data repository 1 to find which IT resources are available (i.e., not reserved) in the specified reservation period.

The vacant period finder 3 finds vacant periods containing the specified reservation period, based on the current reservation records of each IT resource that the IT resource finder 2 has found. Specifically, the vacant period finder 3 calculates how much time each IT resource is available for reservation, during, prior to, and subsequent to the specified reservation period.

The idlest period selector 4 selects an idlest period that offers a largest number of available IT resources, from among the vacant periods that the vacant period finder 3 has found. The idlest period selector 4 may allow an operator (e.g., business application manager) to specify a desired unit period for this task. For example, the business application manager can configure the reservation management apparatus such that it will process the time in hours, days, weeks, or any other units, depending on for what service the IT resources will be used. For example, the start and end times of resource reservations may be recorded in units of hours or minutes. The idlest period selector 4, however, is allowed to evaluate the simultaneity of vacant periods in units of days, if so specified, neglecting the digits of hours and minutes.

The IT resource selector 5 selects an IT resource for reservation, from among a set of IT resources whose vacant periods coincide with the idlest period, to serve the given reservation request 7. If there are many IT resources available in the same period, reserving one of them would not prevent other similar requests from being served in that period (or in other words, it would not spoil the possibility of other resource reservations).

The reservation registration processor 6 registers the selected IT resource with the reservation data repository 1 as determined by the IT resource selector 5.

The above-described reservation management apparatus is implemented on a computer with a reservation management program. Upon receipt of a reservation request 7, the IT resource finder 2 running on that computer identifies IT resources that can be reserved for a period specified in the reservation request 7. Subsequently the vacant period finder 3 identifies vacant periods containing the specified reservation period, based on the reservation records of each IT resource that the IT resource finder 2 has found. The idlest period selector 4 then finds an idlest period that is most populated with available IT resources, by comparing the vacant periods that the vacant period finder 3 has identified. From among a set of IT resources whose vacant periods agree with the idlest period, the IT resource selector 5 selects an appropriate resource to serve the given reservation request 7. The reservation registration processor 6 then registers the reserved IT resource with the reservation data repository 1 as determined by the IT resource selector 5.

As can be seen from the above, the proposed reservation management apparatus is designed to select IT resources from among those found in an idlest period, which makes it more likely to accept subsequent reservation requests. This results in an increased probability of successful allocation of IT resources for those requests, thus achieving a more efficient use of IT resources.

Brokering in Grid Computing Environment

The reservation management apparatus described in the preceding section can be used for brokering grid resources, i.e., submitting jobs to individual computer-implemented functions, in a grid computing environment. A more specific embodiment of the present invention will now be described in detail below, assuming a brokering application of the reservation management apparatus of FIG. 1.

Figure 2:
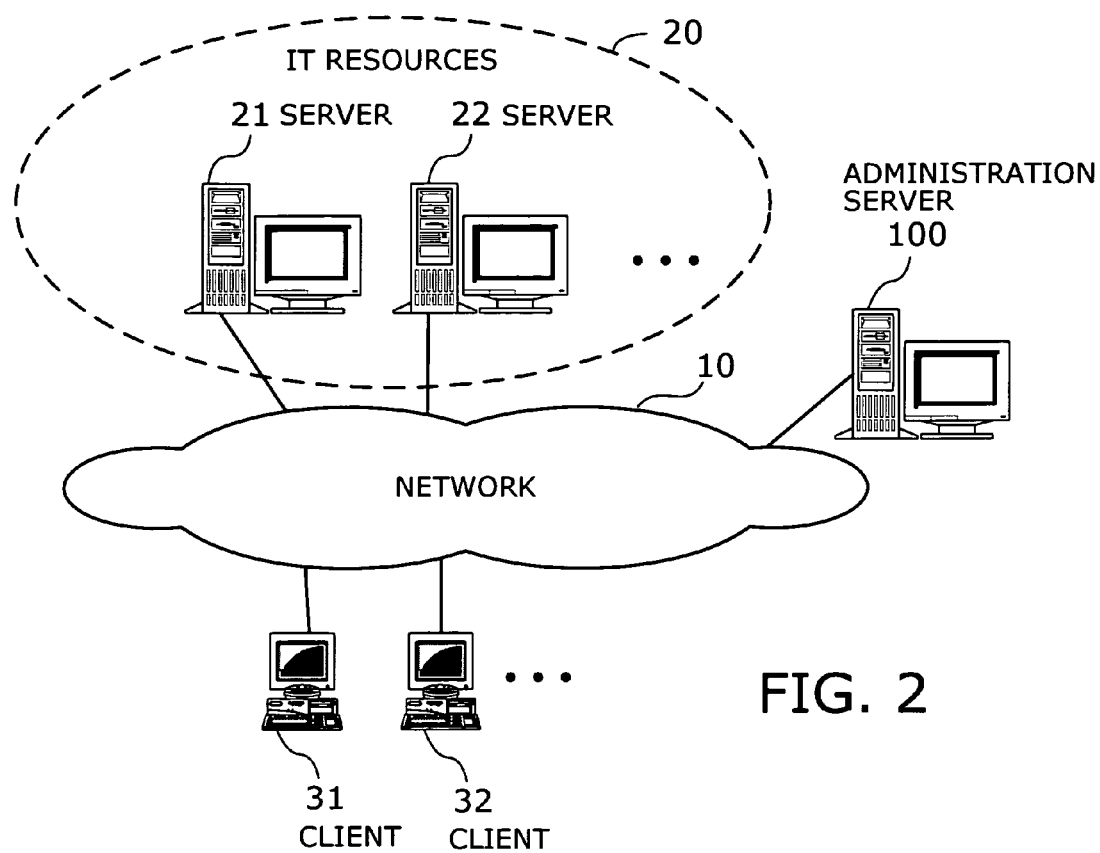
FIG. 2 is a block diagram of a system in which the present invention is embodied.

FIG. 2 is a block diagram of a system in which the present invention is embodied. This embodiment involves a network 10 to connect a plurality of a plurality of clients 31, 32, . . . and administration server 100 with servers 21, 22, . . . working as IT resources 20. The administration server 100 performs scheduling of the IT resources 20. Specifically, the administration server 100 determines which IT resources to allocate on client's demand.

Figure 3:
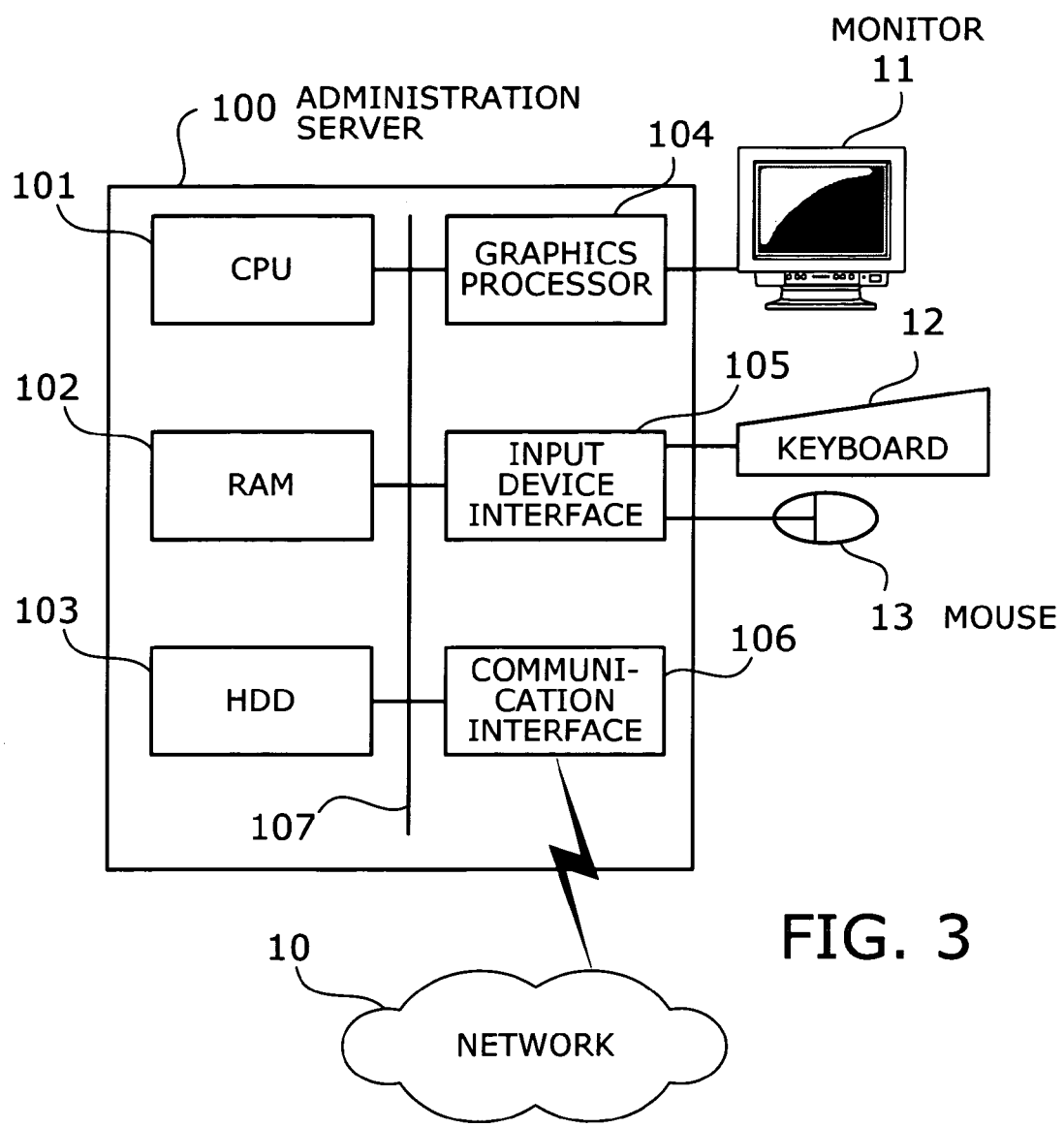
FIG. 3 shows an example hardware configuration of an administration server according to the present embodiment.

FIG. 3 shows an example hardware configuration of the administration server 100 of the present embodiment. The illustrated computer has the following functional elements: a central processing unit (CPU) 101, a random access memory (RAM) 102, a hard disk drive (HDD) 103, a graphics processor 104, an input device interface 105, and a communication interface 106. The CPU 101 controls the entire computer system, interacting with other elements via a bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to the network 10, allowing the CPU 101 to exchange data with other computers (not shown) on the network 10.

The computer system described above serves as a hardware platform for realizing processing functions of the present embodiment.

Figure 4:
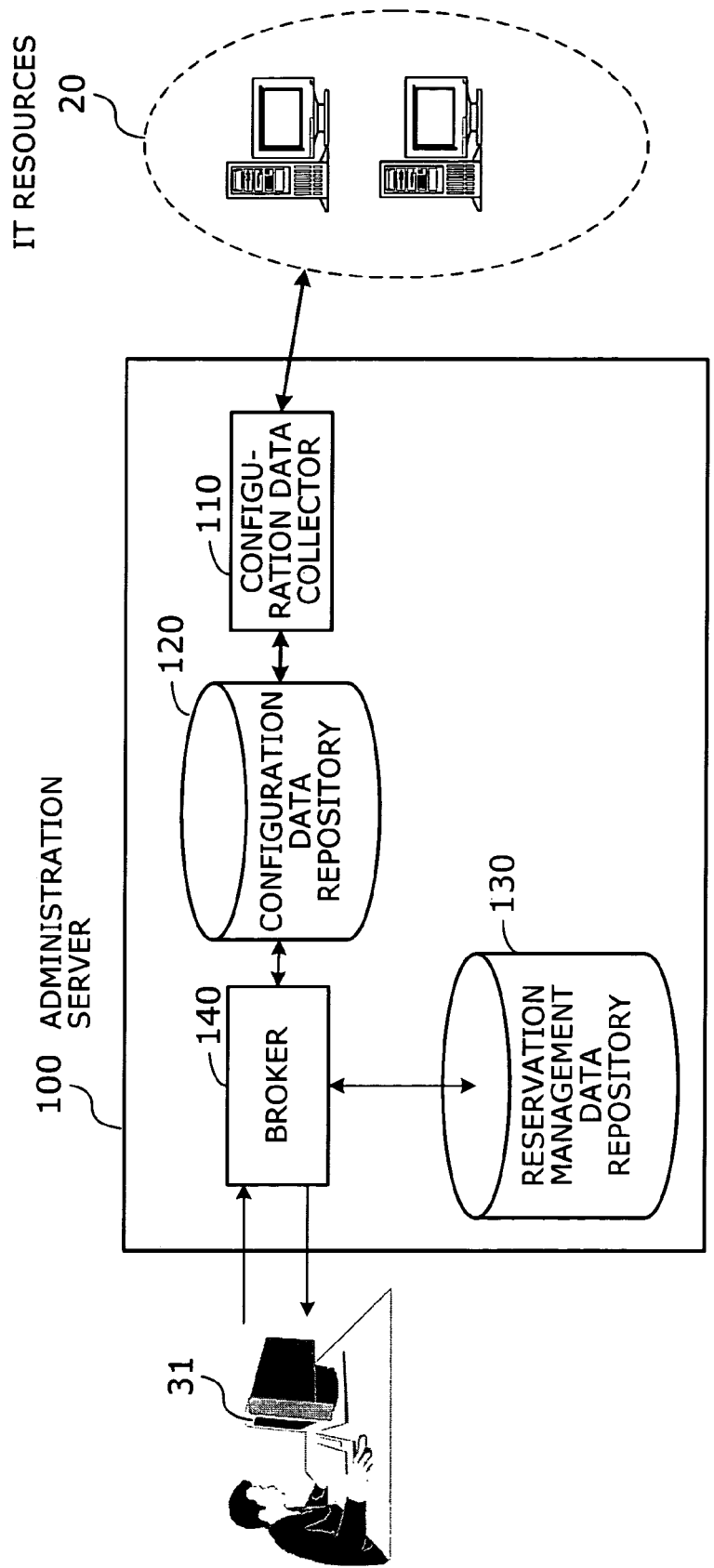
FIG. 4 is a block diagram of the administration server of the present embodiment.

FIG. 4 is a block diagram of the administration server 100. The administration server 100 has a configuration data collector 110, a configuration data repository 120, a reservation management data repository 130, and a broker 140.

The configuration data collector 110 collects information about IT resources from the servers 21, 22, and so on. The collected information is saved in the configuration data repository 120, which serves as a database for managing configuration data of IT resources. Another database, the reservation management data repository 130, manages reservation of IT resources.

The broker 140 allocates IT resources to a client 31 in response to a reservation request from that client 31. Specifically, the broker 140 consults the configuration data repository 120 and reservation data repository 130 to determine which IT resources meet the requirements of the business application manager. The reservation management data repository 130 is then updated with the result. This task aims at maximizing the efficiency of IT resource usage. For that purpose, the broker 140 reserves IT resources while keeping fragmentation of their vacant periods as little as possible, thus making it more likely for subsequent reservation requests to be successfully executed. To suppress the resource fragmentation, the broker 140 selects an IT resource for reservation by examining the time series of vacant periods of each IT resource that satisfies specified conditions and comparing the resources to determine whether they are concurrently available in the same period.

FIG. 5 shows an example data structure of the configuration data repository 120. The illustrated configuration data repository 120 has data fields titled "IT Resource" and "Configuration Data." The IT resource field stores an identifier of a server that provides IT resources. The configuration data field contains a description of how IT resources of a corresponding server are configured. IT resource configuration data includes information about both hardware and software of a server. Hardware configuration of a server is described as a set of, for example, CPU performance, memory capacity, and hard disk capacity. Software configuration data includes the names and versions of operating system (OS) and middleware components.

FIG. 6 shows an example data structure of the reservation management data repository 130. The illustrated reservation management data repository 130 has the following data fields: "Reservation Period," "IT Resource," and "Application."

The reservation period field is divided into two subfields titled "Start Date" and "End Date" to describe when a resource reservation takes effect and when it expires. The IT resource field contains an identifier indicating which server is reserved as a provider of IT resources. In the present example, this field takes a value of "Server #1," "Server #2," "Server #3," "Server #4," "Server #5," or "Server #6." The application field shows the name of a business application using a corresponding IT resource. In the present example, this field takes a value of "Application a," "Application b," "Application c," "Application d," "Application e," "Application f," "Application g," "Application h," "Application i," "Application j," "Application k," "Application l," "Application m," or "Application n."

The reservation management data repository 130 contains the above-described information to permit the broker 140 to manage reservations of each IT resource.

With the components described in FIGS. 4 to 6, the administration server 100 allocates an IT resource to the requesting client 31. The business application manager interacts with the client 31 by entering necessary commands and data through an IT resource reservation dialog, thus initiating an IT resource reservation request to the administration server 100.

Figure 7:
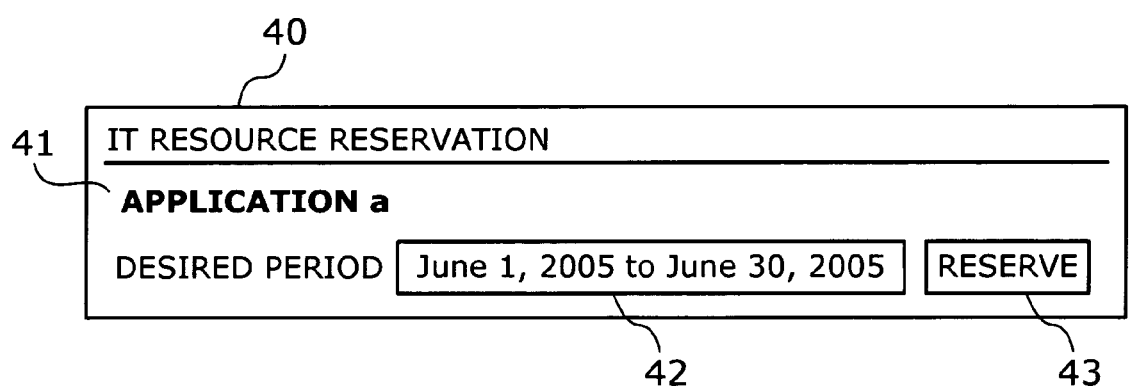
FIG. 7 shows an example of an IT resource reservation dialog.

FIG. 7 shows an example of an IT resource reservation dialog. The illustrated IT resource reservation dialog 40 has an application name field 41, a period entry box 42, and a reserve button 43. The application name field 41 shows the name of an application that needs a reservation of resources. Specifically, the business application manager commands the client 31 to display an IT resource reservation dialog 40, specifying a particular application name. Then the client 31 shows an IT resource reservation dialog 40 on the monitor screen, with the specified application name in its application name field 41.

The period entry box 42 is a text box for entering a desired period of reservation. Specifically, the period entry box 42 accepts entry of desired start and end dates of a reservation. The reserve button 43 is used to submit a reservation request to the administration server 100. Pressing this reserve button 43 initiates transmission of a reservation request from the client 31 to the administration server 100. This request carries information about the application specified in the application name field 41 and its reservation period entered in the period entry box 42.

Figure 8:
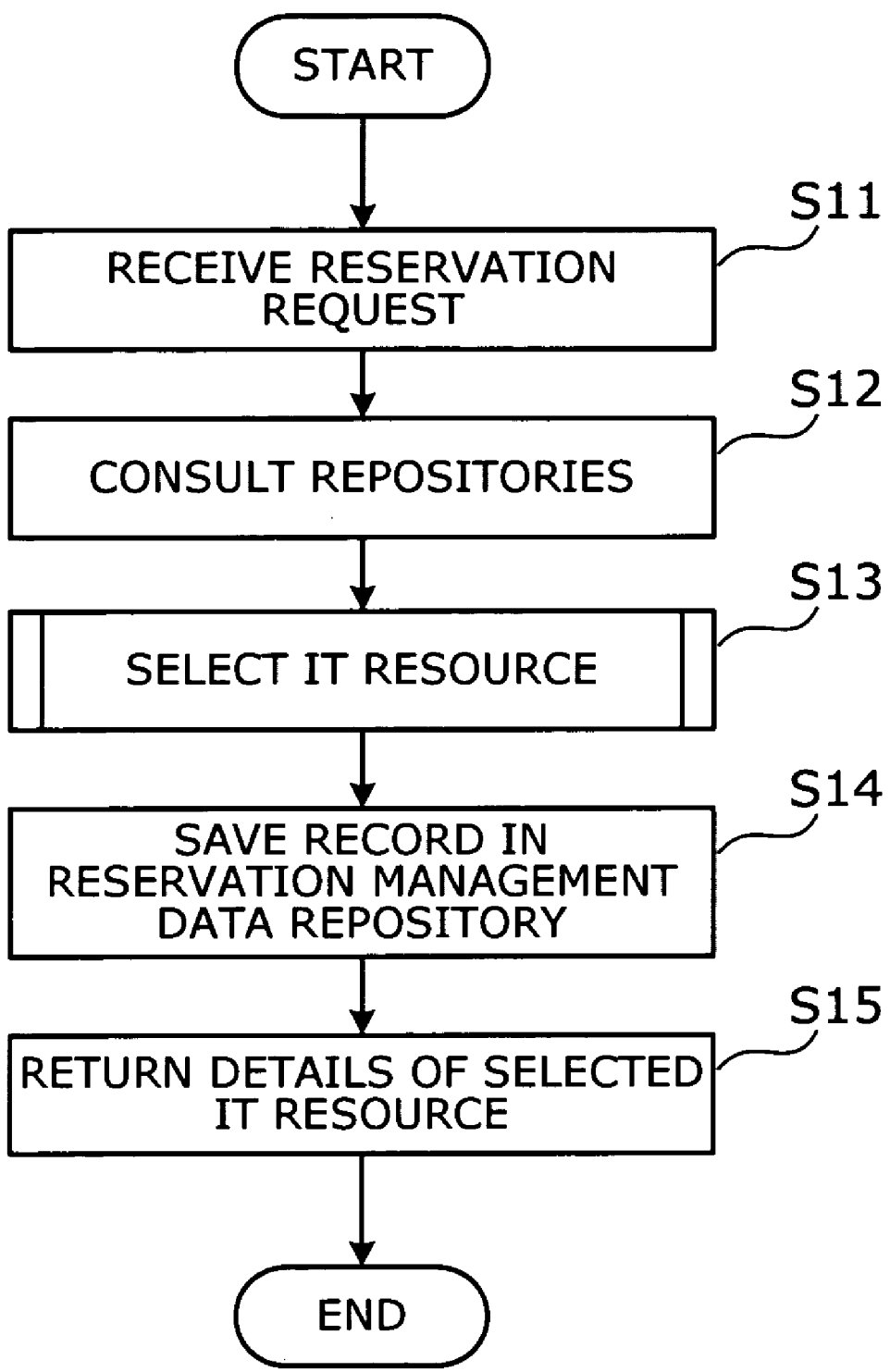
FIG. 8 is a flowchart of an overall process of reserving IT resources.

Upon transmission of a reservation request from the client 31, the receiving administration server 100 activates its broker 140 to begin a process of reserving IT resources. FIG. 8 is a flowchart outlines this resource reservation process, which proceeds in the following steps:

(Step S11) The broker 140 receives a reservation request from the client 31.

(Step S12) The broker 140 consults the configuration data repository 120 and reservation management data repository 130.

(Step S13) The broker 140 selects an IT resource for the requesting application in such a way that the vacant periods of IT resources will be fragmented as little as possible. The details of this process will be discussed later.

(Step S14) The broker 140 records the selected IT resource as a new entry of the reservation management data repository 130.

(Step S15) The broker 140 responds to the requesting client 31 by returning details of the selected IT resource.

The above is an overview of IT resource reservation. The following will now provide more details about step S13.

IT Resource Selection (Detail)

Figure 9:
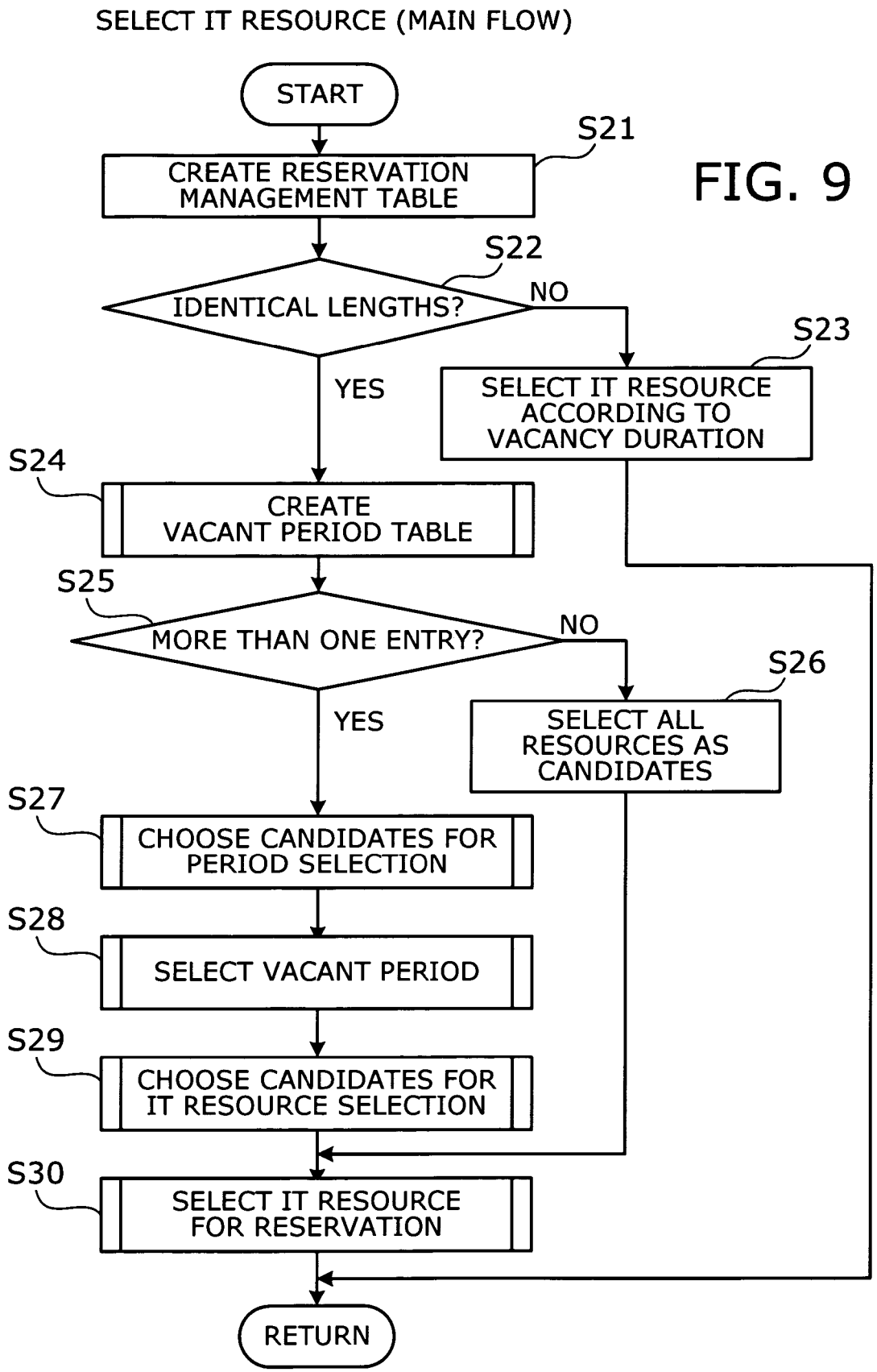
FIG. 9 is a main flowchart showing a process of selecting IT resources.

FIG. 9 is a main flowchart showing the entire process of selecting an IT resource. This process proceeds in the following steps:

(Step S21) The broker 140 searches the configuration data repository 120 and reservation management data repository 130 for IT resources available for reservation, thus extracting a set of candidate IT resources. More specifically, the broker 140 first consults the configuration data repository 120 to identify IT resources (servers) that have necessary components for executing a specified business application. The broker 140 then consults the reservation management data repository 130 to see whether the identified IT resources have already been reserved or not. If there are any such IT resources available in the specified reservation period, the broker 140 creates a reservation management table for them.

FIG. 10 shows an example data structure of a reservation management table. This reservation management table 50 has the following data fields: "IT Resource," "Vacant Period," "First Hypothetical Vacancy Duration," "Second Hypothetical Vacancy Duration," "Candidacy Flag," and "Nomination Flag."

The IT resource field stores the identifier of an available server, and the vacant period field shows a vacant period of IT resource of that server. The vacant period has to contain the reservation period specified in the reservation request.

The first hypothetical vacancy duration field contains the duration of a vacancy that would be produced in the case of cancellation of an immediately preceding reservation. The second hypothetical vacancy duration field contains the duration of a vacancy that would be produced in the case of cancellation of an immediately succeeding reservation.

The candidacy flag field gives a flag indicating whether the corresponding IT resource is identified as a candidate for resource selection. Specifically, this candidacy flag is set to ON for a candidate resource. Otherwise, the candidacy flag stays in its initial state, OFF. The nomination flag field gives a flag indicating that the corresponding IT resource is selected for reservation. This nomination flag is set to ON for a resource to be reserved. Otherwise, it stays in its initial state, OFF.

Referring back to FIG. 9, the present process proceeds to S22 and subsequent steps as follows:

(Step S22) The broker 140 examines the IT resources extracted at step S21 in terms of whether their vacant periods have identical lengths. If all vacant periods have identical lengths, the process advances to step S24. Otherwise, the process branches to step S23.

(Step S23) Depending on the vacancy lengths of the extracted IT resources, the broker 140 selects an appropriate IT resource for reservation. Specifically, the broker 140 selects an IT resource with the shortest vacancy. The present process then terminates itself by returning control to the calling process.

(Step S24) The broker 140 creates a vacant period table and consolidates IT resources with the same vacant period into a single entry of that table. Besides providing vacant period information, the vacant period table shows the number of IT resources with identical vacancy lengths.

Figure 11:
FIG. 11 shows an example data structure of a vacant period table.

FIG. 11 shows an example data structure of a vacant period table. This vacant period table 51 has the following data fields: "Vacant Period," "Resource Counter," "Period Candidacy Flag," and "Period selection flag." The vacant period field shows a vacant period shared by a plurality of IT resources, and the resource counter field shows the number of those IT resources. The period candidacy flag field stores a flag that indicates whether the corresponding vacant period is a candidate for period selection. This period candidacy flag is set to ON when the broker 140 determines the vacant period as a selection candidate. Otherwise, the period candidacy flags stay in their initial OFF state.

The period selection flag field contains a flag indicating whether the corresponding vacant period is selected for reservation. This period selection flag is set to ON when the broker 140 selects the period for reservation. Otherwise, the flag stays in its initial OFF state.

Referring back to FIG. 9, the process now proceeds to S25 and subsequent steps as follows:

(Step S25) The broker 140 determines whether the vacant period table has more than one entry. In other words, the broker 140 tests the presence of variations of vacancy. If the table has two or more entries, the process advances to step S27. If there is only one entry, the process branches to step S26.

(Step S26) Since there is no variation of vacancy, the broker 140 selects all IT resources listed in the reservation management table 50 as selection candidates. Specifically, the broker 140 turns on the candidacy flag of every entry in the reservation management table 50. The process then proceeds to step S30.

(Step S27) The broker 140 chooses candidates for period selection. Specifically, the broker 140 extracts vacant periods containing the largest number of available IT resources from among the plurality of variations of vacant periods, and it nominates all of them as selection candidates. More specifically, the broker 140 consults the vacant period table 51 to identify vacant periods that offer the largest number of available IT resources and sets their respective period candidacy flags to an ON state. In the case where the identified IT vacant periods are equal in terms of the number of IT resources, the broker 140 nominates all those vacant periods as selection candidates.

As can be seen from the above, the broker 140 gives a higher priority to vacant periods offering more reservable IT resources. This is because the broker 140 attempts not to reduce the availability of resources for subsequent reservations. That is, if there are many IT resources with the same vacant period, reserving one of those resources would still allow other similar reservation requests to be served successfully.

(Step S28) The broker 140 determines which vacant period to use for reservation. Specifically, the broker 140 selects a vacant period that comes sooner than others. That is, the broker 140 select an earlier vacant period in preference to others in an attempt to maintain a greater pool of reservable IT resources to deal with future reservation requests.

(Step S29) The broker 140 nominates IT resources in the vacant period determined at step S28 as selection candidates. Specifically, the broker 140 consults the reservation management table 50 to extract IT resources corresponding to the determined vacant period and sets their respective candidacy flags to the ON state.

(Step S30) The broker 140 finally determines which IT resource to reserve. Specifically, the broker 140 first seeks preceding and succeeding reservations with respect to each candidate IT resource. The broker 140 then chooses an IT resource that would produce a minimum vacancy duration if its preceding or succeeding reservation were cancelled. By so doing, the broker 140 minimizes possible fragmentation in the case of cancellation of those reservations.

Creating Vacant Period Table (Detail)

Figure 12:
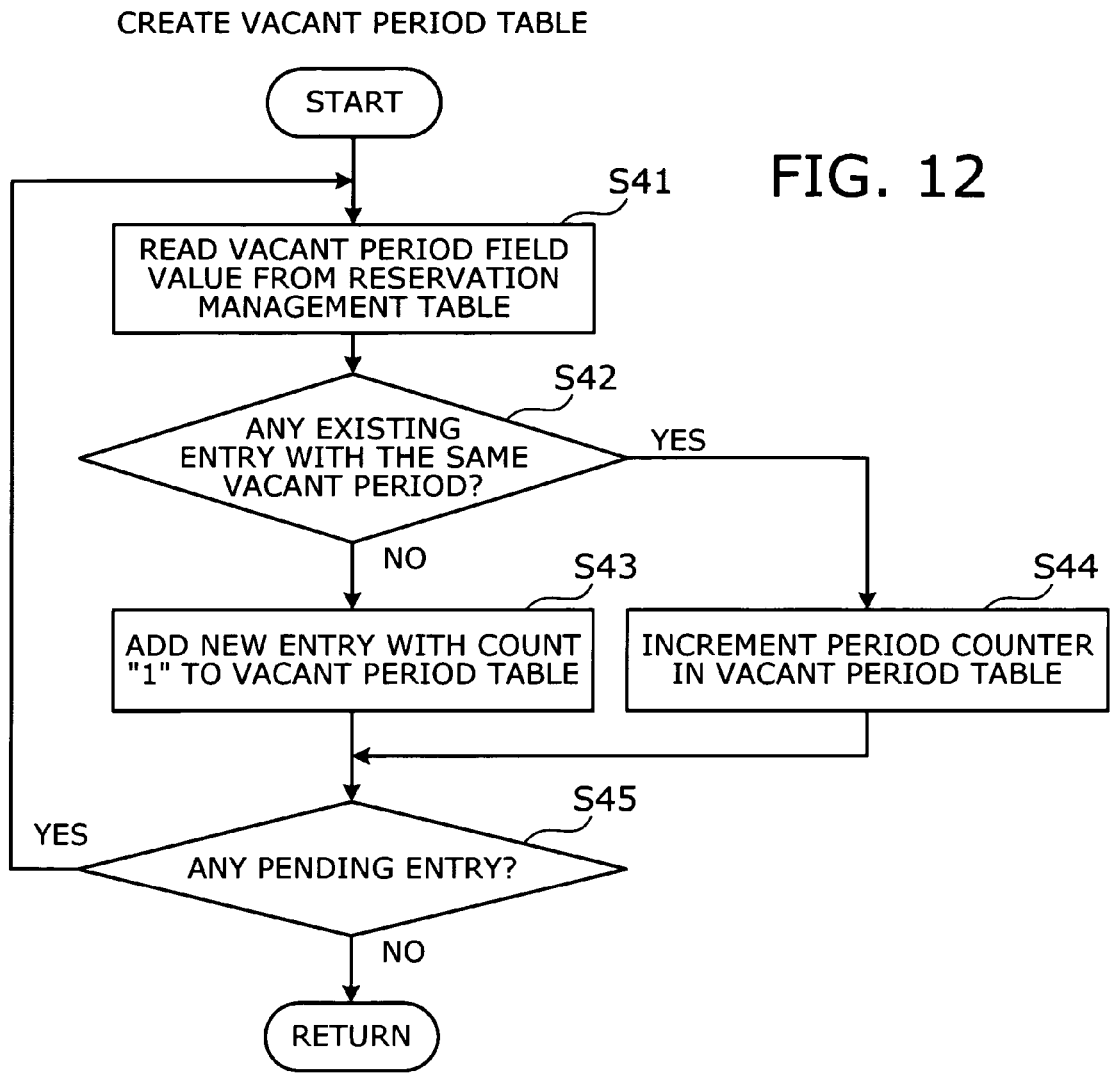
FIG. 12 is a flowchart of a process of creating a vacant period table.

This section provides details of the process called at step S24 of FIG. 9. FIG. 12 is a flowchart showing a process of creating a vacant period table. This flowchart proceeds in the following steps, assuming that an initial version of a vacant period table 51 has been prepared.

(Step S41) The broker 140 reads a vacant period field value from a newly focused entry of the reservation management table 50.

(Step S42) The broker 140 determines whether there is an existing entry of the vacant period table 51 that contains the vacant period obtained at step S41. If so, the process advances to step S44. If not, the process proceeds to step S43.

(Step S43) The broker 140 adds a new entry containing the vacant period of S41 to the vacant period table 51 and sets its resource counter field to one. The process then advances to step S45.

(Step S44) Since the same vacant period is found in an existing entry of the vacant period table 51, the broker 140 then increments the resource counter field of that entry by one.

(Step S45) The broker 140 determines whether there is any pending entry in the reservation management table 50. If there is, the process advances to step S41. If all entries have been finished, the process of FIG. 12 terminate itself by returning control to the calling process.

Choosing Candidates for Period Selection (Detail)

Figure 13:
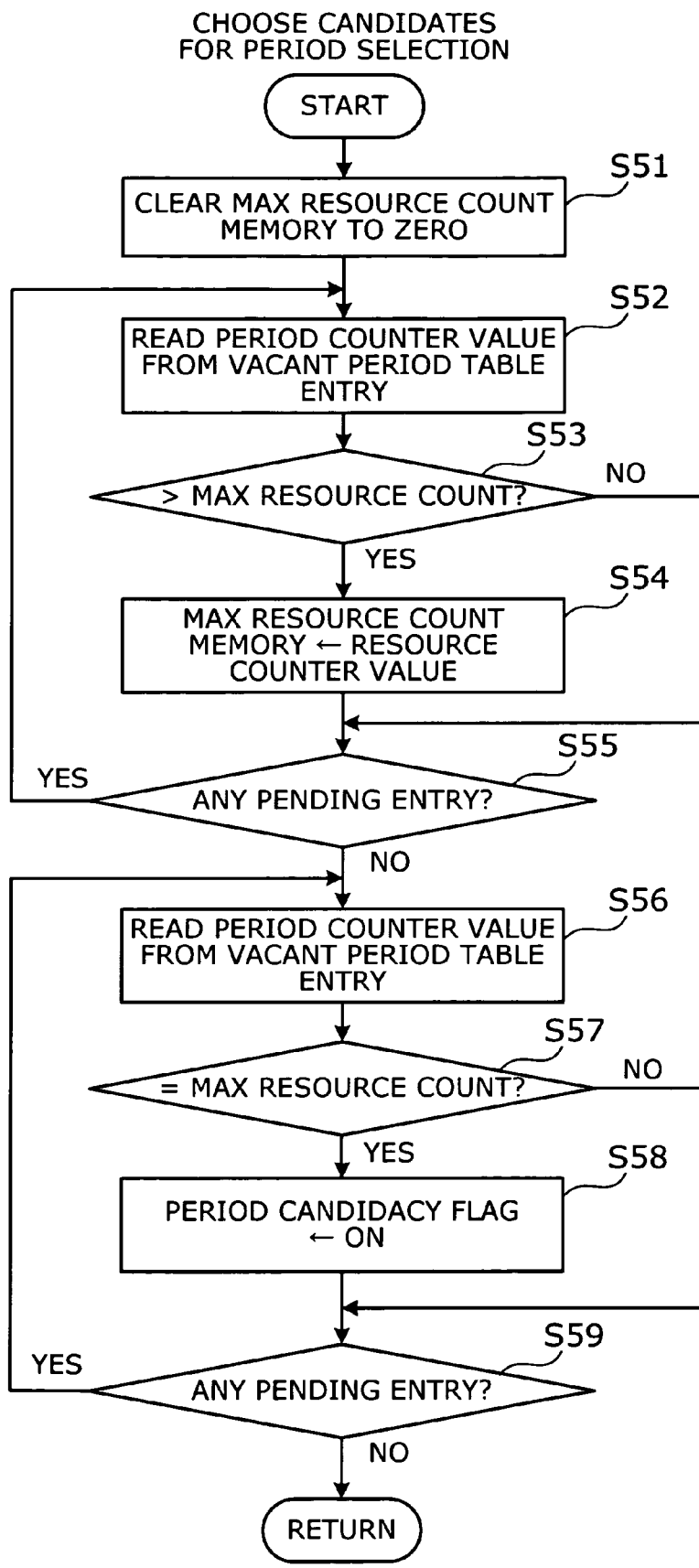
FIG. 13 is a flowchart of a process of choosing candidates for vacant period selection.

This section provides details of the process called at step S27 of FIG. 9. FIG. 13 is a flowchart of a process of selecting candidates for vacant period selection, which proceeds in the following steps:

(Step S51) The broker 140 creates a maximum resource count memory and clears it to zero.

(Step S52) The broker 140 obtains a resource counter field value from a newly focused entry of the vacant period table 51.

(Step S53) The broker 140 examines the resource counter value obtained at step S52 to determine whether it is greater than the current value of the maximum resource count memory. If so, the process advances to step S54. If not, the process skips to step S55.

(Step S54) The broker 140 enters the obtained resource counter value to the maximum resource count memory.

(Step S55) The broker 140 determines whether there is any pending entry in the vacant period table 51. If there is, the process returns to step S52. If not, the process proceeds to step S56 after resetting all entries of the vacant period table 51 to the pending state.

(Step S56) The broker 140 obtains a resource counter field value from a newly focused entry of the vacant period table 51.

(Step S57) The broker 140 examines the resource counter value obtained at step S56 to determine whether it is equal to the value of the maximum resource count memory. If so, the process advances to step S58. If not, the process skips to step S59.

(Step S58) The broker 140 gives an ON state to the period candidacy flag in the currently focused entry of the vacant period table 51.

(Step S59) The broker 140 determines whether there is any pending entry in the vacant period table 51. If there is, the process returns to step S56. If all entries have been finished, the process of FIG. 13 terminates itself by returning control to the calling process.

Selecting Vacant Period (Detail)

Figure 14:
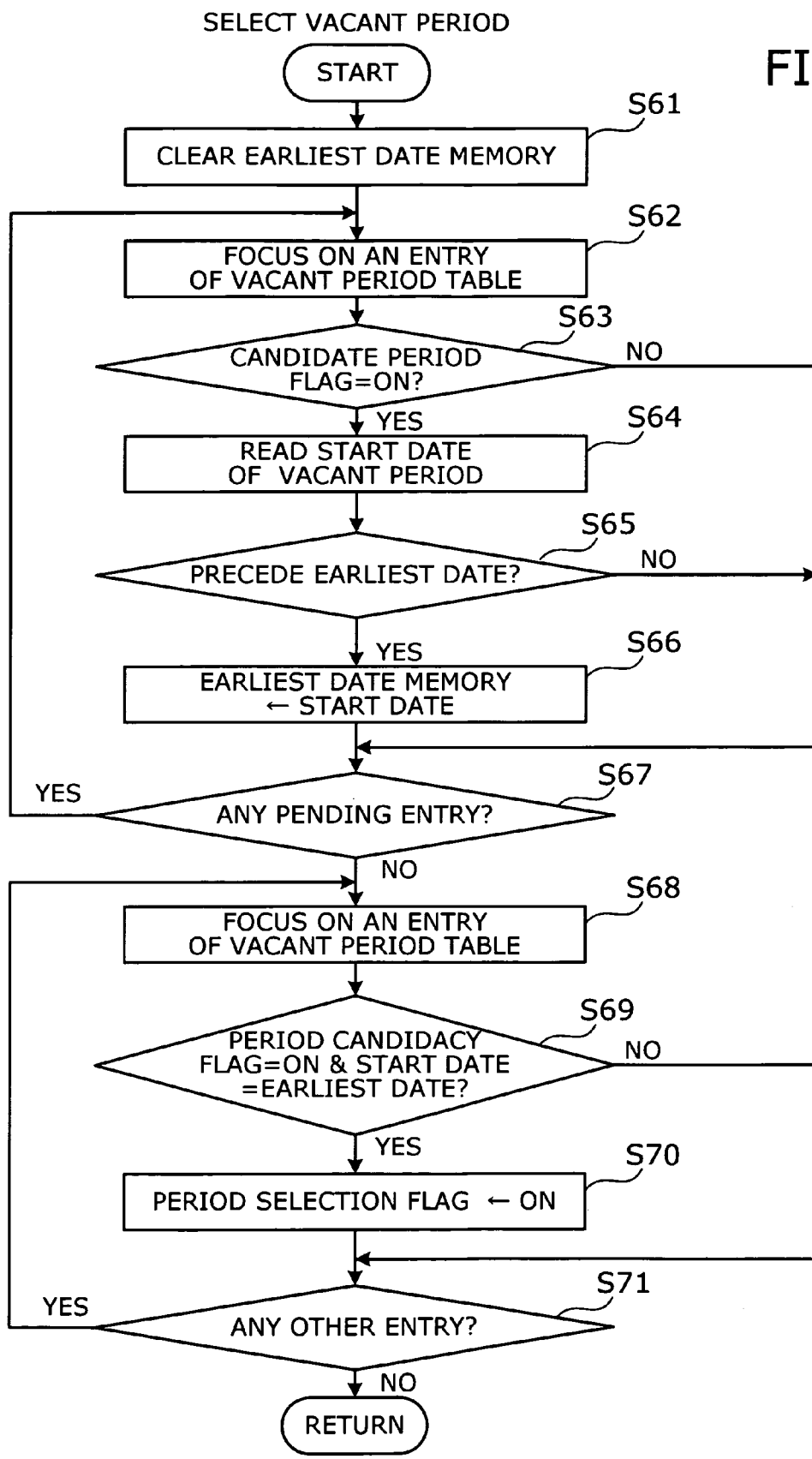
FIG. 14 is a flowchart of a process of selecting a vacant period.

This section provides details of the process called at step S28 of FIG. 9. FIG. 14 is a flowchart of a process of selecting a vacant period for resource reservation, which proceeds in the following steps:

(Step S61) The broker 140 clears an earliest date memory.

(Step S62) The broker 140 focuses on a pending entry of the vacant period table 51.

(Step S63) The broker 140 determines whether the period candidacy flag of the currently focused entry is ON. If it is ON, the process advances to step S64. If it is OFF, the process skips to step S67.

(Step S64) The broker 140 reads the start date field (part of the vacant period field) of the currently focused entry.

(Step S65) The broker 140 determines whether the obtained start date precedes the date currently set in the earliest date memory. If so, the process advances to step S66. If they are the same date, or if the former follows the latter, the process skips to step S67.

(Step S66) The broker 140 updates the earliest date memory with the obtained start date.

(Step S67) The broker 140 determines whether there is any pending entry in the vacant period table 51. If there is, the process returns to step S62. If not, the process proceeds to step S68 after resetting all entries of the vacant period table 51 to the pending state.

(Step S68) The broker 140 focuses on a pending entry of the vacant period table 51.

(Step S69) The broker 140 determines whether the period candidacy flag of the currently focused entry is set to ON, as well as whether the start date recorded in that entry coincides with the date that the earliest date memory indicates. If both of those conditions are true, the process advances to step S70. Otherwise, the process skips to step S71.

(Step S70) The broker 140 gives an ON state to the period selection flag in the currently focused entry of the vacant period table 51.

(Step S71) The broker 140 determines whether there is any pending entry in the vacant period table 51. If there is, the process returns to step S68. If all entries have been finished, the process of FIG. 14 terminates itself by returning control to the calling process.

Choosing Candidates for Resource Selection (Detail)

Figure 15:
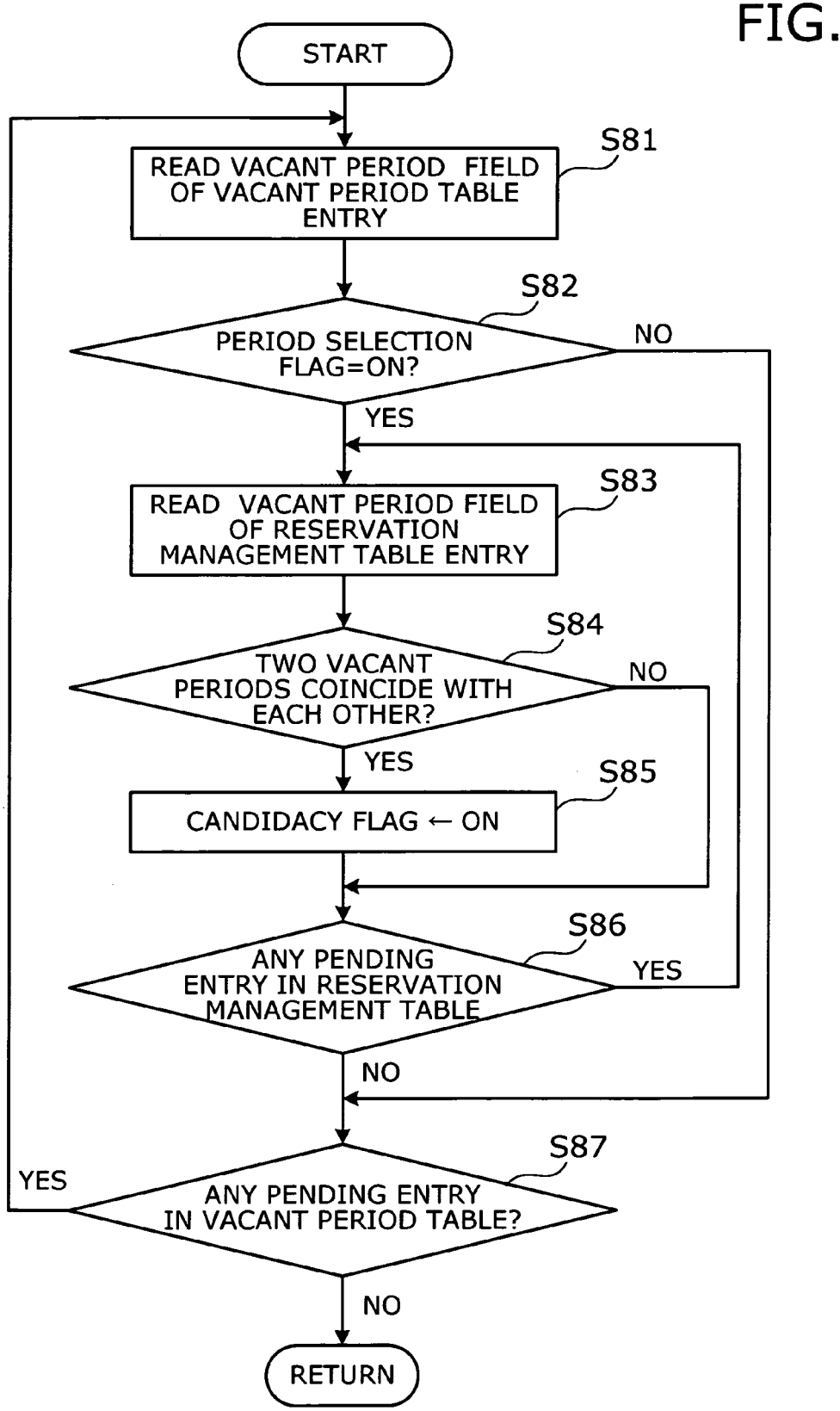
FIG. 15 is a flowchart of a process of choosing candidates for IT resource selection.

This section provides details of the process called at step S29 of FIG. 9. FIG. 15 is a flowchart of a process of choosing IT resource candidates, which proceeds in the following steps:

(Step S81) The broker 140 obtains a vacant period field value from a newly focused entry of the vacant period table 51.

(Step S82) The broker 140 determines whether the period selection flag of the currently focused entry is set to ON. If so, the process advances to step S83. If not, the process skips to step S87.

(Step S83) The broker 140 reads the vacant period field value of a newly focused entry of the reservation management table 50.

(Step S84) The broker 140 determines whether the two vacant period values obtained at steps S81 and S83 coincide with each other. If so, the process advances to step S85. If not, the process skips to step S86.

(Step S85) The broker 140 gives an ON status to the candidacy flag in the currently focused entry of the reservation management table 50.

(Step S86) The broker 140 determines whether there is any pending entry in the reservation management table 50. If there is, the process returns to step S83. If all entries have finished, the process advances to step S87.

(Step S87) The broker 140 determines whether there is any pending entry in the vacant period table 51. If there is, the process returns to step S81. If all entries have been finished, the process of FIG. 15 terminates itself by returning control to the calling process.

Selecting IT Resource for Reservation (Detail)

This section provides details of the process called at step S30 of FIG. 9. FIGS. 16 to 19 show a flowchart of a process of selecting an IT resource for reservation. This process proceeds in the following steps:

(Step S101) The broker 140 focuses on a pending entry of the reservation management table 50.

(Step S102) The broker 140 determines whether the candidacy flag of the currently focused entry is set to ON. If it is ON, the process proceeds to step S104. If it is OFF, the process advances to step S103.

Figure 18:
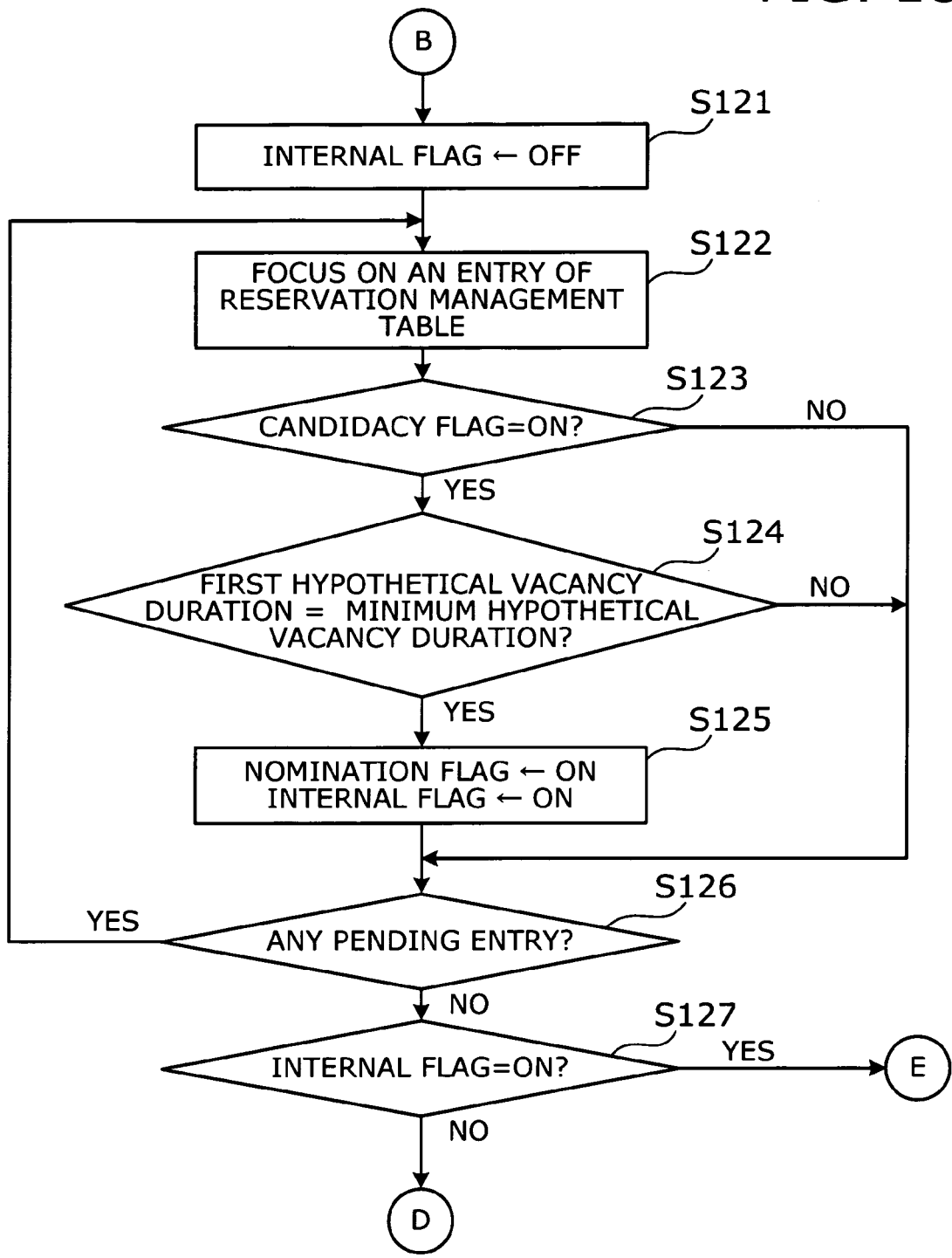

(Step S103) The broker 140 determines whether there is any pending entry in the reservation management table 50. If there is, the process returns to step S101. If all entries have finished, the process advances to step S121 (FIG. 18).

(Step S104) The broker 140 consults the reservation management data repository 130 to find an existing reservation period that immediately precedes the vacant period shown in the currently focused entry. More specifically, the table entry selected at step S101 indicates a specific IT resource and its corresponding vacant period. The reservation management data repository 130 may have some reservation entries for that selected IT resource. From among those reservations, the broker 140 identifies an existing reservation immediately preceding the above vacant period.

(Step S105) The broker 140 further finds the next preceding reservation period from the reservation management data repository 130.

(Step S106) Assuming that the IT resource of the currently focused entry is reserved while its immediately preceding reservation is canceled, the broker 140 calculates the duration of a hypothetical vacancy that could be produced. Specifically, the broker 140 calculates a time duration that begins at the end of the next preceding reservation period and terminates at the beginning of a desired reservation period specified in the reservation request. The calculated duration means how long the vacancy would be if the immediately preceding reservation were canceled. This is referred to as a "first hypothetical vacancy duration," and the broker 140 enters the calculated first hypothetical vacancy duration to a corresponding field of the currently focused entry of the reservation management table 50.

In the case where there is only one preceding reservation, the broker 140 calculates a first hypothetical vacancy duration that starts from the present date and terminates at the beginning of a desired reservation period specified in the reservation request.

(Step S107) The broker 140 determines whether the currently focused entry is the very first candidate for resource selection. If it is, the process advances to step S108. If not, the process skips to step S109.

(Step S108) The broker 140 saves the first hypothetical vacancy duration of step S106 in a minimum hypothetical vacancy memory.

Figure 17:
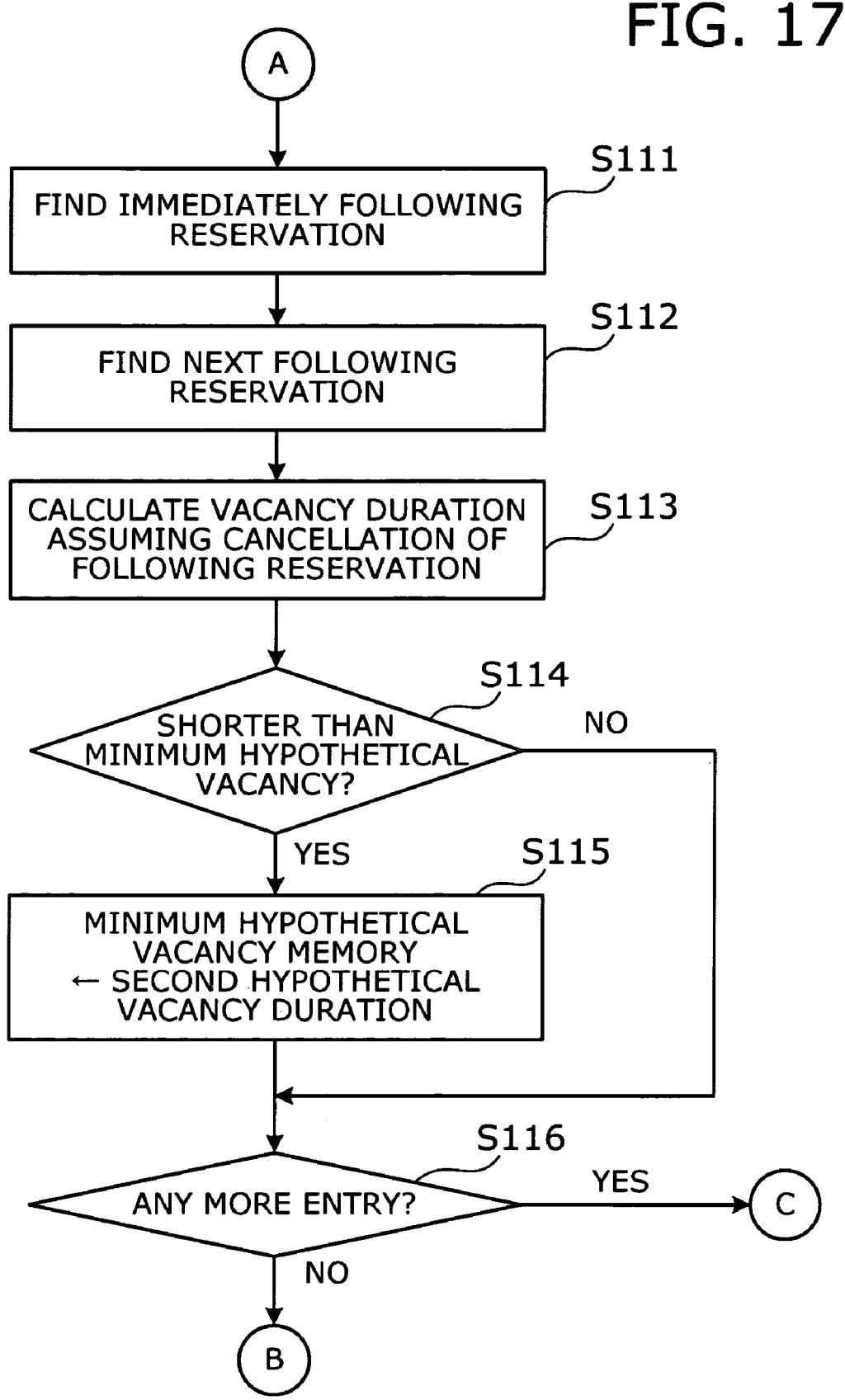

(Step S109) The broker 140 determines whether the first hypothetical vacancy duration is shorter than the current value of the minimum hypothetical vacancy memory. If so, the process advances to step S110. If not, the process proceeds to step S111 (FIG. 17).

(Step S110) The broker 140 updates the minimum hypothetical vacancy memory with the first hypothetical vacancy duration calculated at step S106. The process then advances to step S111 (FIG. 17).

(Step S111) The broker 140 consults the reservation management data repository 130 to find an existing reservation period that immediately follows the vacant period of the currently focused entry. More specifically, the table entry selected at step S101 indicates a specific IT resource and its corresponding vacant period. The reservation management data repository 130 may have some reservation entries for that selected IT resource. From among those reservations, the broker 140 identifies an existing reserved period that immediately follows the above vacant period.

(Step S112) The broker 140 further finds the next following reservation period from the reservation management data repository 130.

(Step S113) Assuming that the IT resource of the currently focused entry is reserved while its immediately following reservation is canceled, the broker 140 calculates the duration of a hypothetical vacancy that could be produced as a result of the cancellation. Specifically, the broker 140 calculates a time duration that begins at the end of a desired reservation period specified in the reservation request and terminates at the beginning of the next following reservation period. The calculated duration means how long the vacancy would be if the immediately following reservation were canceled. This is referred to as a "second hypothetical vacancy duration," and the broker 140 enters the calculated second hypothetical vacancy duration to a corresponding field of the currently focused entry of the reservation management table 50.

(Step S114) The broker 140 determines whether the second hypothetical vacancy duration is shorter than the current value of the minimum hypothetical vacancy memory. If so, the process advances to step S115. If not, the process proceeds to step S116.

(Step S115) The broker 140 updates the minimum hypothetical vacancy memory with the second hypothetical vacancy duration calculated at step S113.

Figure 16:
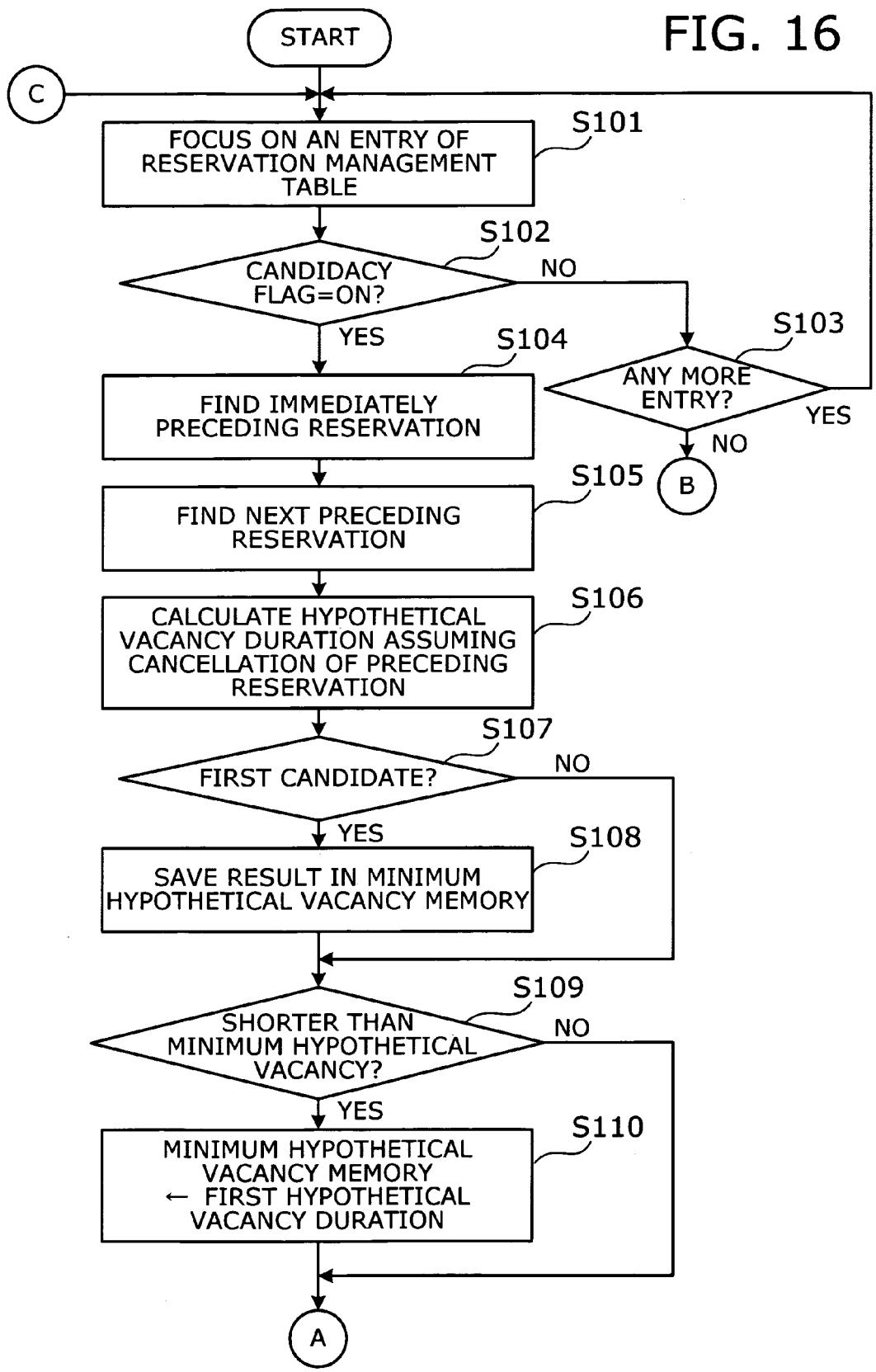
FIGS. 16 to 19 are first to fourth parts of a flowchart showing a process of selecting an IT resource for reservation.

(Step S116) The broker 140 determines whether there is any pending entry in the reservation management table 50. If there is, the process goes back to step S101 (FIG. 16). If all entries have been finished, the process advances to step S121 (FIG. 18).

(Step S121) Besides resetting every entry of the reservation management table 50 to a pending state, the broker 140 creates an internal flag with an initial state of OFF. As will be described later, this flag is used to indicate that an IT resource is selected because of its small duration of the first hypothetical vacancy.

(Step S122) The broker 140 focuses on a pending entry of the reservation management table 50.

(Step S123) The broker 140 determines whether the candidacy flag of the currently focused entry is set to ON. If it is ON, the process advances to step S124. If it is OFF, the process skips to step S126.

(Step S124) The broker 140 determines whether the first hypothetical vacancy duration equals the second hypothetical vacancy duration. If so, the process advances to step S125. If not, the process skips to step S126.

(Step S125) The broker 140 gives an ON state to the nomination flag of the currently focused entry, as well as turning on the internal flag.

(Step S126) The broker 140 determines whether there is any pending entry in the reservation management table 50. If there is, the process returns to step S122. If all entries have finished, the process advances to step S127.

Figure 19:
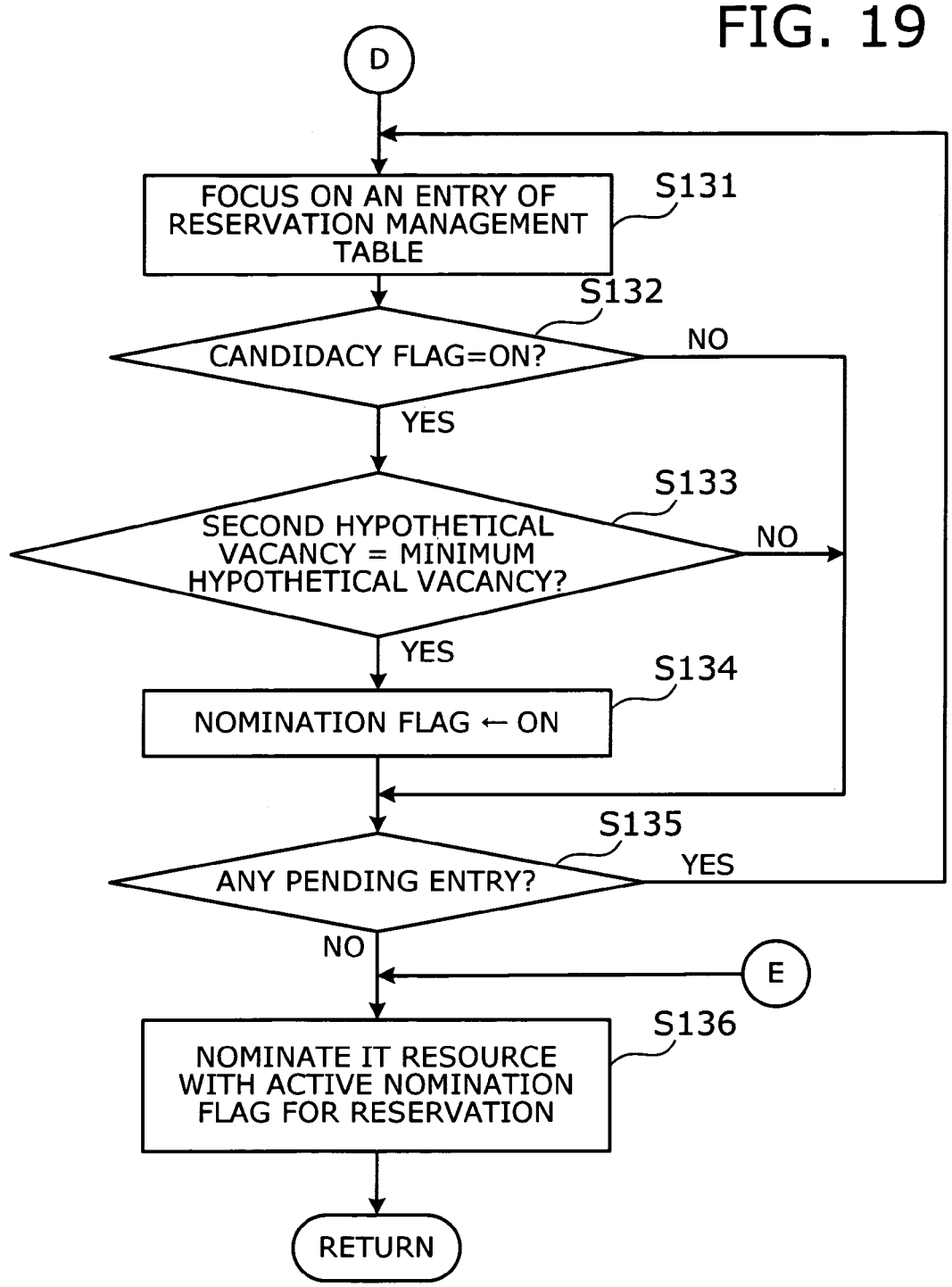

(Step S127) The broker 140 determines whether the internal flag is set to ON. If it is OFF, the broker 140 proceeds to step S131 (FIG. 19) after resetting every entry of the reservation management table 50 to pending state. If it is ON, the process skips to step S136 (FIG. 19).

(Step S131) The broker 140 focuses on a pending entry of the reservation management table 50.

(Step S132) The broker 140 determines whether the candidacy flag of the currently focused entry is set to ON. If it is ON, the process advances to step S133. If it is OFF, the process skips to step S135.

(Step S133) The broker 140 determines whether the second hypothetical vacancy duration equals the minimum hypothetical vacancy duration. If they have the same duration, the process advances to step S134. If not, the process skips to step S135.

(Step S134) The broker 140 gives an ON state to the nomination flag of the currently focused entry.

(Step S135) The broker 140 determines whether there is any pending entry in the reservation management table 50. If there is, the process returns to step S131. If all entries have finished, the process advances to step S136.

(Step S136) Now that the reservation management table 50 contains an entry with its nomination flag set to ON, the broker 140 nominates the IT resource of that entry for reservation.

Example of Resource Reservation

The process described in the above sections allocates and reserves IT resources for a given reservation request. Suppose now that the broker 140 has received a reservation request of FIG. 7 specifying a period of Jun. 1, 2005 to Jun. 30, 2005. In response to this request, the broker 140 searches reservation management data repository 130 for IT resources available in that period. For explanatory purposes, FIG. 20 presents a time table 131 of existing reservations. This time table 131 represents reservations registered in the reservation management data repository 130 in tabular form, with the date on its horizontal axis. Each hatched block indicates a time period during which a corresponding IT resource shown in the leftmost column is reserved, Every hatched block also contains the identifier of the business application that is scheduled in that period. For simplicity, the example of FIG. 20 assumes that each application is allowed to reserve resources on a monthly basis.

The reservation request of FIG. 7 invokes a search for IT resources that are available in the entire period 131a of June 2005. This search reveals that five servers #1 to #5 are available during that period 131a. The broker 140 then calculates how long each found IT resource is available around the specified reservation period. The result is that every available server has a vacant period of three months. This means that the vacancy duration cannot differentiate them.

Then the broker 140 counts IT resources that are concurrently available in each vacant period. In the example of FIG. 20, two servers #1 and #2 are both available in a three-month period of Jun. 1, 2005 to Aug. 31, 2005. In another three-month period of Apr. 1, 2005 to Jun. 30, 2005, another two servers #3 and #4 are vacant. Server #5 is available from May 1, 2005 to Jul. 31, 2005, but there are no other servers available during the same period.

In choosing candidates for vacant period selection, the broker 140 gives a higher priority to a period containing a greater number of IT resources sharing the same vacant period. This policy results in the following two candidate periods: "Jun. 1, 2005 to Aug. 31, 2005" and "Apr. 1, 2005 to Jun. 30, 2005." When two candidate periods have the same number of IT resources, the broker 140 chooses the one that comes earlier in time. In the example of FIG. 20, the latter candidate period is selected for reservation since April comes before June.

Two servers #3 and #4 can serve the reservation request in the selected vacant period. The broker 140 then calculates some hypothetical vacancies, assuming that the requested period is reserved while its immediately preceding or following reservation is cancelled. Server #3 has a reservation of Application c in March, three months before June. Its vacancy would amount to four months, Feb. 1, 2005 to May 31, 2005, if the reservation for Application c were cancelled. Server #4, on the other hand, has a two-month reservation of Application c in February and March. If this reservation were cancelled, the server #4 would have a five-month vacant period of Jan. 1, 2005 to May 31, 2005.

Server #3 also has a two-month reservation of Application h starting from July, immediately following the assumed reservation of June. If that application h were canceled, the server #3 would gain a three-month vacant period from Jul. 1, 2005 to Sep. 30, 2005. Another hypothetical vacant period of Server #4 would be a two-month period of Jul. 1, 2005 to Aug. 31, 2005, assuming cancellation of the reservation for Application i. This means that Server #4 has a shorter hypothetical vacancy than Server #3, assuming cancellation of an immediately following reservation. The broker 140 thus selects Server #4 as an IT resource for reservation.

Figure 21:
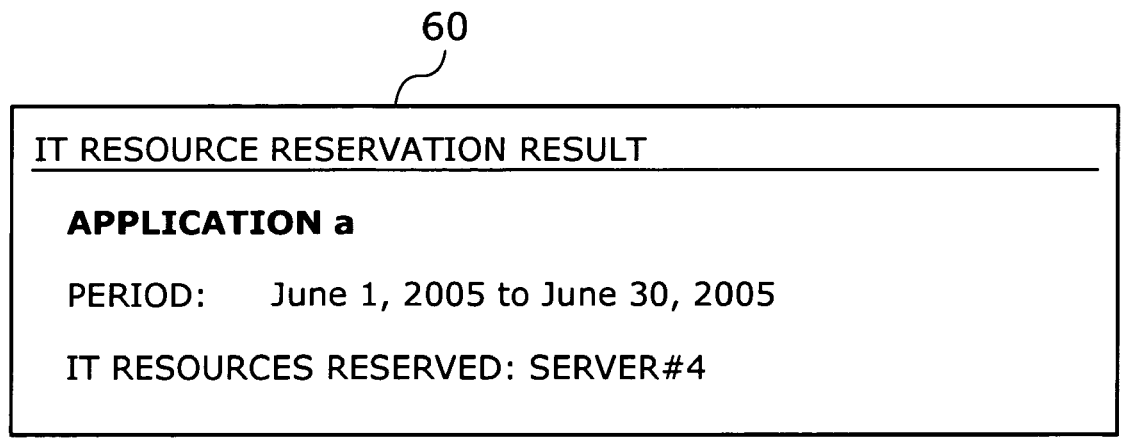
FIG. 21 shows an example of a reservation result dialog.

The above reservation result is sent from the administration server 100 to the requesting client 31, which causes a reservation result dialog to appear on a screen of the client 31. FIG. 21 gives an example of a reservation result dialog. This reservation result dialog 60 shows the name of an application scheduled to be executed in the reserved period, the period of reservation, and the name of an IT resource reserved for that application.

As can be seen from the above example, the present embodiment of the invention selects a vacant period in which a plurality of IT resources are available and reserves an IT resource available in that period, thus making it more likely for subsequent reservation requests to be successfully executed. When two or more IT resources are available in a selected period, the present embodiment gives preference on an IT resource with a vacant period that comes earlier than others. In other words, the present embodiment attempts to save future IT resources as much as possible. This policy gives subsequent reservation requests a better chance of successful acceptance.

The present embodiment further considers possibility of cancellation of an existing reservation preceding or following the selected vacant period. More specifically, the present embodiment gives preference on an IT resource with a minimum hypothetical vacancy in the case of cancellation of a preceding or following reservation. This algorithm minimizes undesired fragmentation of vacant periods.

When processing a reservation request, the present embodiment makes decisions in terms of how to increase the possibility of acceptance of subsequent requests. This approach of the present embodiment permits more business applications to reserve necessary IT resources successfully, thus achieving efficient use of IT resources.

Computer-Readable Storage Media

The above-described processing mechanisms of the present invention are actually implemented on a computer system, the instructions being encoded and provided in the form of computer programs. A computer system executes such programs to provide the intended functions of the present invention. For the purpose of storage and distribution, the programs may be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network.

A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

The present embodiment is designed to select an IT resource for reservation from among those in a period which is most populated with available resources, thus increasing the possibility of acceptance of subsequent reservation requests. As a result, more business applications can reserve necessary IT resources successfully, thus achieving efficient use of IT resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable medium storing a program for managing reservation of IT resources, the program causing a computer to function as:
    a reservation data repository storing reservation records of IT resources;
    an IT resource finder, responsive to a reservation request specifying a desired reservation period, that finds IT resources available for reservation in the specified reservation period by consulting the reservation data repository;
    a vacant period finder that finds a plurality of continuous vacant periods with equal lengths, each of which contains the entire specified reservation period, while counting the number of IT resources available over the individual vacant period that is found, based on the reservation records of each IT resource that the IT resource finder has found;
    an idlest period selector that selects one of the found vacant periods that offers the largest number of available IT resources;
    an IT resource selector that selects, for reservation to serve the reservation request, an IT resource whose vacant period coincides with the selected vacant period,
    wherein:
        there are a plurality of IT resources whose vacant periods coincide with the selected vacant period;
        the IT resource selecting calculates a hypothetical vacancy duration of each of the IT resources, assuming that said each IT resource is reserved for the specified reservation period and that an existing reservation preceding or following the specified reservation period is canceled; and
        the IT resource selecting selects an IT resource with a minimum hypothetical vacancy duration for reservation; and
    a reservation registration processor that registers the selected IT resource with the reservation data repository as determined by the IT resource selector.

2. The non-transitory computer-readable medium according to claim 1, wherein the IT resource selector selects an IT resource whose vacant period comes earlier than others in the case where there are a plurality of IT resources whose vacant periods coincide with the selected vacant period.

3. The non-transitory computer-readable medium according to claim 1, further comprising a configuration data repository storing records describing functions of each IT resource, wherein:
    the reservation request further specifies a type of business applications;
    the IT resource finder searches the configuration data repository to extract IT resources capable of executing tasks of the specified type of business applications; and
    the IT resource finder identifies IT resources available for reservation in the specified reservation period, from among the extracted IT resources.

4. A reservation management apparatus for managing reservation of IT resources, comprising at least one processing device which operates as:
    a reservation data repository storing reservation records of IT resources;
    an IT resource finder, responsive to a reservation request specifying a desired reservation period, that finds IT resources available for reservation in the specified reservation period by consulting the reservation data repository;
    a vacant period finder that finds a plurality of continuous vacant periods with equal lengths, each of which contains the entire specified reservation period, while counting the number of IT resources available over the individual vacant period that is found, based on the reservation records of each IT resource that the IT resource finder has found;
    an idlest period selector that selects one of the found vacant periods that offers the largest number of available IT resources;
    an IT resource selector that selects, for reservation to serve the reservation request, an IT resource whose vacant period coincides with the idlest-selected vacant period,
    wherein:
        there are a plurality of IT resources whose vacant periods coincide with the selected vacant period;
        the IT resource selecting calculates a hypothetical vacancy duration of each of the IT resources, assuming that said each IT resource is reserved for the specified reservation period and that an existing reservation preceding or following the specified reservation period is canceled; and
        the IT resource selecting selects an IT resource with a minimum hypothetical vacancy duration for reservation; and
    a reservation registration processor that registers the selected IT resource with the reservation data repository as determined by the IT resource selector.

5. The reservation management apparatus according to claim 4, wherein the IT resource selector selects an IT resource whose vacant period comes earlier than others in the case where there are a plurality of IT resources whose vacant periods coincide with the selected vacant period.

6. The reservation management apparatus according to claim 4, the processing device further operating as a configuration data repository storing records describing functions of each IT resource, wherein:
    the reservation request further specifies a type of business applications;
    the IT resource finder searches the configuration data repository to extract IT resources capable of executing tasks of the specified type of business applications; and
    the IT resource finder identifies IT resources available for reservation in the specified reservation period, from among the extracted IT resources.

7. A reservation management method, executed by a computer including a storage device, for managing reservation of IT resources, comprising:
    providing a reservation data repository in the storage device of the computer to store reservation records of IT resources;

responsive to a reservation request specifying a desired reservation period, finding IT resources available for reservation in the specified reservation period by consulting the reservation data repository;

finding a plurality of continuous vacant periods with equal lengths, each of which contains the entire specified reservation period, while counting the number of IT resources available over the individual vacant period that is found, based on the reservation records of each IT resource that has been found;

selecting one of the found vacant periods that offers the largest number of available IT resources;

selecting, for reservation to serve the reservation request, an IT resource whose vacant period coincides with the selected vacant period, wherein:

there are a plurality of IT resources whose vacant periods coincide with the selected vacant period;

the IT resource selecting calculates a hypothetical vacancy duration of each of the IT resources, assuming that said each IT resource is reserved for the specified reservation period and that an existing reservation preceding or following the specified reservation period is canceled; and the IT resource selecting selects an IT resource with a minimum hypothetical vacancy duration for reservation; and registering the selected IT resource with the reservation data repository.

8. The reservation management method according to claim 7, wherein the IT resource selecting selects an IT resource whose vacant period comes earlier than others in the case where there are a plurality of IT resources whose vacant periods coincide with the selected vacant period.

9. The reservation management method according to claim 7, further comprising providing a configuration data repository to store records describing functions of each IT resource, wherein:

the reservation request further specifies a type of business applications;

the IT resource finding searches the configuration data repository to extract IT resources capable of executing tasks of the specified type of business applications; and the IT resource finding identifies IT resources available for reservation in the specified reservation period, from among the extracted IT resources.

\* \* \* \* \*